April 29, 1952  C. F. BRYANT  2,595,051
TACKLE HOLDER
Filed Aug. 11, 1949

Inventor
CLAUDE F. BRYANT
By [signature]
HIS ATTY.

Patented Apr. 29, 1952

2,595,051

UNITED STATES PATENT OFFICE 2,595,051

TACKLE HOLDER

Claude F. Bryant, Shreveport, La.

Application August 11, 1949, Serial No. 109,690

1 Claim. (Cl. 43—57.5)

This invention relates to a tackle holder, and has for one of its objects the production of a simple and efficient means for supporting a plurality of fishing lures in a convenient position where they will be handy to the user and will be supported in a proper position to prevent loss or entanglement with the fishing tackle, and where they may be easily released from the holder with a minimum amount of inconvenience or effort.

A further object of this invention is the production of a simple and efficient tackle holder which is formed in one piece of material and comprises a minimum number of parts which are arranged to facilitate the attachment and removal of fishing lures to and from the holder.

Other objects and advantages of the present invention will appear throughout the following specification and claim.

Figure 1:
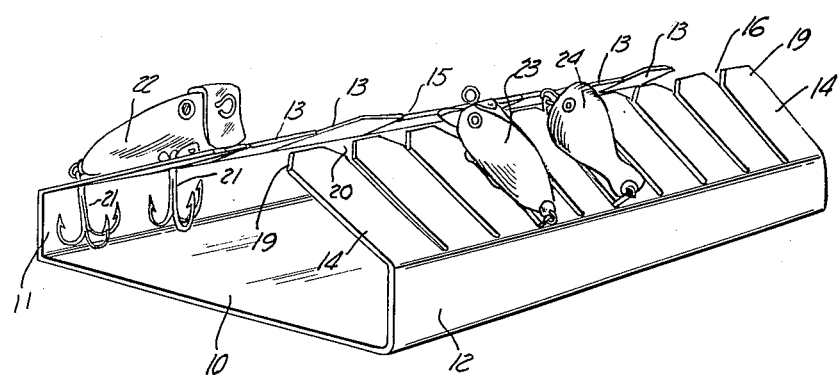
Figure 1 is a perspective view of the tackle holder.

By referring to the drawing, it will be seen that 10 designates the base or bottom of the tackle holder, which base 10 is preferably flat and of a desired length. The base 10 is provided with a pair of longitudinally extending parallel side walls 11 and 12 which extend vertically of the base and are formed integrally with the parallel side edges of the base 10.

Figure 3:
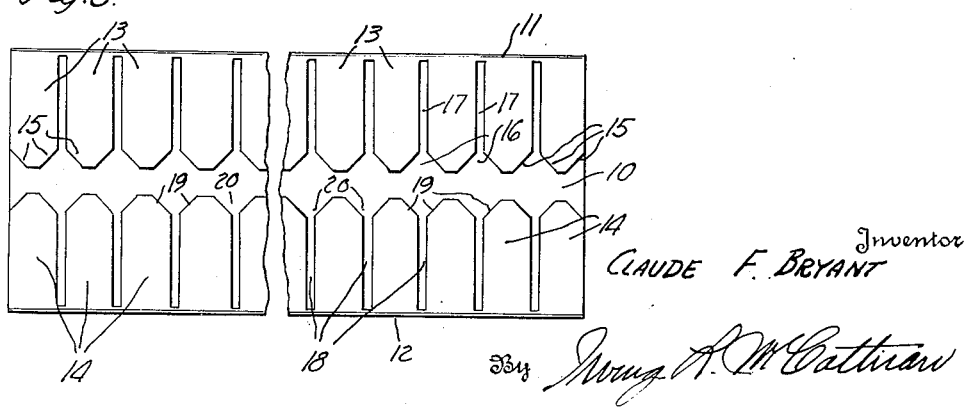
Figure 3 is a top plan view of the tackle holder, reduced in size.

The wall 11 is provided with a plurality of spaced yieldable inwardly and upwardly inclined parallel tongues 13 which extend substantially transversely of the longitudinal axis of the tackle holder. The wall 12 is also provided with similar tongues 14 which are spaced from each other and are inwardly and upwardly inclined and are arranged in spaced parallel relation, as shown in Figures 1 and 3. The tongues 13 are beveled or tapered at their outer ends, as at 15, to provide wide diverging entrance openings 16 at the entrances of the slots 17, which slots are defined by the spaced parallel tongues 13, and which slots 17 extend longitudinally between the tongues 13. Slots 18 also are defined by the spaced tongues 14 and these slots extend longitudinally of the tongues 14. The tongues 14 also are provided with tapered or beveled ends 19 which provide wide diverging entrance openings 20 at the outer ends of the slots 18.

Figure 2:
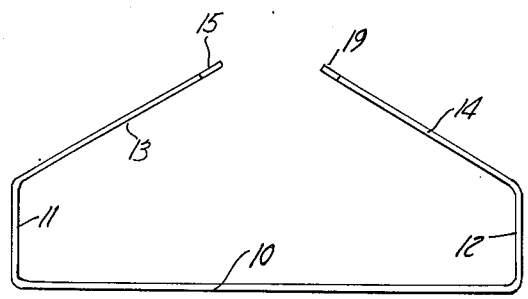
Figure 2 is an end view thereof.

By noting Figures 1 and 2, it will be seen that the tongues 13 which are carried by the wall 11, converge upwardly toward the tongues 14 which are carried by the wall 12, and that the outer ends of the tongues 13 terminate short of the outer ends of the tongues 14. This arrangement provides an efficient means for facilitating the placing of the lures in position upon, and the removal of the lures from, the tackle holder. In operation, the hooks 21 of the lure 22 are dropped down between the spaced ends of the opposed tongues 13 and 14 and the shanks of the hooks are guided into one of the slots 17, the lure lying upon the top of the tongues 13 in a position to straddle the slot 17 between two of the tongues 13 and in an upwardly inclined position. The lure 22 easily may be extracted by an upward pull in the direction of the outer end of the slot 17. The inclined position of the tongues 13 will tend to hold the lures in position when the hooks thereof are fitted in the slots between the tongues, and the spaced arrangement of the outer ends of the tongues 13 and 14 will facilitate the removal of the lures from the tackle holder when a lure is moved to a position to release the hooks 21 from the slot 17 in which they have been fitted. The upward converging tongues 13 and 14 which define the respective slots 17 and 18, and the spaced end of these slots provide a structural arrangement which will facilitate the placing and holding of the lures in position upon the tackle holder and will also provide means for facilitating the removal of the lures with a minimum amount of effort.

Due to the particular structure of applicant's device, it will be noted that because of the structure of the upwardly inclined and converging sets of tongues carried by the holder, the lures may be dropped upon the holder in the space between the inner ends of the sets of tongues so that the hooks hang into the holder. When the lures are released from the fingers of the user, the lures will automatically slide downwardly toward the side walls by pull of gravity, the hooks and/or connecting shanks fitting within the slots between the tongues and thereby connecting or holding the lures in a position where they may be easily lifted from the holder.

It should be noted that the inner ends of the tongues 14 of the wall 12 converge upwardly and inwardly toward the inner ends of the tongues 13 of the wall 11, and since all of these tongues are yieldable the tongues may be easily depressed downwardly toward the base 10. Consequently, when placing a lure between the tongues 13, the outer ends of the tongues 14 may be depressed downwardly to prevent the hooks from the lure which is being mounted in position or removed from the tackle holder from becoming entangled with the tongues 14 or the lures carried by the opposite wall. This is particularly of advantage where a lure which is being placed in the holder is provided with large hooks. The holder, therefore, is adaptable for use with lures having hooks of various sizes.

The tackle holder provides a simple and efficient means for supporting the lures at all times in place, and when so supported there is no danger of the lures becoming entangled with other fishing gear, or of the lures being left in the bottom of the boat when the lures are not in use. The holder may be placed in the bottom of the boat, or in any convenient location, and the hooks of the lures will at all times, be shielded since they hang within the holder through the slots which are defined by the spaced tongues.

It should be noted that the tongues 14 may support the lures 23 and 24, as well as other lures, in a manner similar to that described with respect to the lures 22.

Having described the invention, what is claimed as new is:

A tackle holder comprising a single sheet of material having a flat base and vertical side walls spaced laterally from each other, each wall having a plurality of laterally spaced yieldable upwardly inclined tongues defining slots between the tongues, each tongue having a free tapered end defining a wide diverging entrance opening at the outer ends of said slots to facilitate the insertion of hooks of a fishing lure therein, the free ends of the tongues of one wall being spaced from and converging toward the inner ends of the tongues of the other wall, the inclined position of the tongues constituting an inclined support for the body of a lure in a manner whereby the hooks carried by the lure will be suspended through and below the slots between the tongues to shield and protect the hooks from injury, the inclined tongues also facilitating the automatic sliding of the lures toward the side walls of the holder by the pull of gravity to secure the lures to the holder when a lure is fitted upon the tackle holder and is released from the fingers of a user, the yieldable nature of said tongues facilitating the depression of the tongues of one wall while removing a lure from between the tongues of the opposite wall to prevent the entangling of the hooks thereof with the tongues of the opposite wall and the lures carried by the tongues of the opposite wall.

CLAUDE F. BRYANT.

REFERENCES CITED

The following references are of record in the file of this patent:

UNITED STATES PATENTS

| Number | Name | Date |
|---|---|---|
| 1,054,487 | Bagley | Feb. 25, 1913 |
| 1,561,622 | Wagner | Nov. 17, 1925 |
| 1,687,137 | Myers | Oct. 9, 1928 |
| 1,954,127 | Harsted | Apr. 10, 1934 |
| 2,122,770 | Colin | July 5, 1938 |
| 2,220,817 | Holmes | Nov. 5, 1940 |